(12) United States Patent
Kyriacou

(10) Patent No.: US 12,158,865 B2
(45) Date of Patent: Dec. 3, 2024

(54) AUTOMATED DATABASE ARTIFACT UPDATE USING DESIGN DEFINITIONS

(71) Applicant: BUSINESS OBJECTS SOFTWARE LTD, Dublin (IE)

(72) Inventor: George Kyriacou, Dublin (IE)

(73) Assignee: BUSINESS OBJECTS SOFTWARE LTD

( * ) Notice: Subject to any disclaimer, the term of this patent is extended or adjusted under 35 U.S.C. 154(b) by 0 days.

(21) Appl. No.: 18/072,944

(22) Filed: Dec. 1, 2022

(65) Prior Publication Data

US 2024/0184753 A1 Jun. 6, 2024

(51) Int. Cl.
*G06F 16/00* (2019.01)
*G06F 11/14* (2006.01)
*G06F 11/34* (2006.01)
*G06F 16/21* (2019.01)

(52) U.S. Cl.
CPC ........ *G06F 16/211* (2019.01); *G06F 11/1433* (2013.01); *G06F 11/3419* (2013.01); *G06F 2201/80* (2013.01)

(58) Field of Classification Search
CPC ............... G06F 16/211; G06F 11/1433; G06F 11/3419; G06F 2201/80
See application file for complete search history.

(56) References Cited

U.S. PATENT DOCUMENTS

2020/0065136 A1\* 2/2020 Singh ..................... G06F 16/211
2022/0067026 A1\* 3/2022 Katkade .............. G06F 16/2455

\* cited by examiner

*Primary Examiner* — Cheryl Lewis
(74) *Attorney, Agent, or Firm* — Mintz Levin Cohn Ferris Glovsky and Popeo, P.C.

(57) ABSTRACT

A method, a system, and computer program product for updating various database artifacts using design definitions. A design time definition is received for a database artifact stored in a database. Design time metadata is extracted from the design time definition. Runtime metadata is retrieved from the database, the runtime metadata corresponding to the database artifact. Differences are determined between the design time metadata and the runtime metadata. An update query is generated based on the differences between the design time metadata and the runtime metadata. The update query is executed to update the database artifact.

20 Claims, 4 Drawing Sheets

AUTOMATED DATABASE ARTIFACT UPDATE USING DESIGN DEFINITIONS

TECHNICAL FIELD

This disclosure relates generally to updating databases and, in particular, to updating various database artifacts using design definitions.

BACKGROUND

Known methods of updating database implementations require manual code to be written to update various database artifacts, such as tables, and views. In most cases, the manual code for updating database artifacts includes a series of complex alter statements that increase in complexity with an increase in volume changes. Some solutions that attempt to improve database updates rely on file versioning. Updating methods based on file versioning can require users to develop alter statements in addition to keeping file versions. Known methods of updating databases can further increase in complexity if trying to revert any changes. Reverting to an older version of the database artifacts can be based on a second set of commands defining how to perform the database downgrade.

SUMMARY

Systems, methods, and articles of manufacture, including computer program products, are provided for updating database artifacts using design definitions. In one aspect, there is provided a computer-implemented method including: receiving, by one or more processors, a design time definition for a database artifact stored in a database, extracting, by the one or more processors, design time metadata from the design time definition, retrieving, by the one or more processors, runtime metadata from the database, the runtime metadata corresponding to the database artifact, determining, by the one or more processors, differences between the design time metadata and the runtime metadata, generating, by the one or more processors, an update query based on the differences between the design time metadata and the runtime metadata, and executing, by the one or more processors, the update query to update the database artifact.

In some variations, one or more of the features disclosed herein including the following features can optionally be included in any feasible combination. The database artifact can include a multidimensional object.

In some variations, the design time definition includes a request to modify a dimension of the multidimensional object.

In some variations, the computer-implemented method further includes: generating, by the one or more processors, remedial definitions based on the differences between the design time metadata and the runtime metadata, and generating, by the one or more processors, the update query using the remedial definitions indicating the differences between the design time metadata and the runtime metadata.

In some variations, retrieving, by the one or more processors, the runtime metadata from the database includes: querying, by the one or more processors, a storage location storing the database artifact, the storage location storing a plurality of metadata records corresponding to a plurality of states of the database artifact, searching, by the one or more processors, using at least an identifier of the database artifact, the plurality of metadata records to search an identifier of the runtime metadata corresponding to a current state of the database artifact, and retrieving, by the one or more processors, based on the identifier, the runtime metadata corresponding to the current state of the database artifact.

In some variations, the computer-implemented method further includes: receiving, by the one or more processors, a query to revert the database artifact to a past structure, and searching, by the one or more processors, using at least the identifier of the database artifact, the plurality of metadata records to search a past metadata corresponding to the past structure of the database artifact, generating, by the one or more processors, a reverting query based on the differences between the past metadata and the runtime metadata, and executing, by the one or more processors, the revert query to update the database artifact.

In some variations, the computer-implemented method further includes: determining, by the one or more processors, an access level to update the database artifact, and selectively executing, by the one or more processors, the update query to update the database artifact according to the access level.

In one aspect, there is provided a system including: at least one programmable processor, and a non-transitory machine-readable medium storing instructions that, when executed by the at least one programmable processor, cause the at least one programmable processor to perform operations including: receiving a design time definition for a database artifact stored in a database, extracting design time metadata from the design time definition, retrieving runtime metadata from the database, the runtime metadata corresponding to the database artifact, determining differences between the design time metadata and the runtime metadata, generating an update query based on the differences between the design time metadata and the runtime metadata, and executing the update query to update the database artifact.

In some variations, one or more of the features disclosed herein including the following features can optionally be included in any feasible combination. The system of example 8, wherein the database artifact includes a multi-dimensional object.

In some variations, the design time definition includes a request to modify a dimension of the multidimensional object.

In some variations, the operations further include: generating remedial definitions based on the differences between the design time metadata and the runtime metadata, and generating the update query using the remedial definitions indicating the differences between the design time metadata and the runtime metadata.

In some variations, retrieving the runtime metadata from the database includes: querying a storage location storing the database artifact, the storage location storing a plurality of metadata records corresponding to a plurality of states of the database artifact, searching using at least an identifier of the database artifact, the plurality of metadata records to search an identifier of the runtime metadata corresponding to a current state of the database artifact, and retrieving based on the identifier, the runtime metadata corresponding to the current state of the database artifact.

In some variations, the operations further include: receiving a query to revert the database artifact to a past structure, and searching using at least the identifier of the database artifact, the plurality of metadata records to search a past metadata corresponding to the past structure of the database artifact, generating a reverting query based on the differences between the past metadata and the runtime metadata, and executing the revert query to update the database artifact.

In some variations, the operations further include: determining an access level to update the database artifact, and selectively executing the update query to update the database artifact according to the access level.

In one aspect, there is provided a non-transitory computer readable medium storing instructions, which when executed by at least one data processor, result in operations including: receiving a design time definition for a database artifact stored in a database, extracting design time metadata from the design time definition, retrieving runtime metadata from the database, the runtime metadata corresponding to the database artifact, determining differences between the design time metadata and the runtime metadata, generating an update query based on the differences between the design time metadata and the runtime metadata, and executing the update query to update the database artifact.

In some variations, one or more of the features disclosed herein including the following features can optionally be included in any feasible combination. The system of example 8, wherein the database artifact includes a multidimensional object.

In some variations, the design time definition includes a request to modify a dimension of the multidimensional object.

In some variations, the operations further include: generating remedial definitions based on the differences between the design time metadata and the runtime metadata, and generating the update query using the remedial definitions indicating the differences between the design time metadata and the runtime metadata.

In some variations, retrieving the runtime metadata from the database includes: querying a storage location storing the database artifact, the storage location storing a plurality of metadata records corresponding to a plurality of states of the database artifact, searching using at least an identifier of the database artifact, the plurality of metadata records to search an identifier of the runtime metadata corresponding to a current state of the database artifact, and retrieving based on the identifier, the runtime metadata corresponding to the current state of the database artifact.

In some variations, the operations further include: receiving a query to revert the database artifact to a past structure, and searching using at least the identifier of the database artifact, the plurality of metadata records to search a past metadata corresponding to the past structure of the database artifact, generating a reverting query based on the differences between the past metadata and the runtime metadata, and executing the revert query to update the database artifact.

In some variations, the operations further include: determining an access level to update the database artifact, and selectively executing the update query to update the database artifact according to the access level.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a non-transitory computer-readable or machine-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter relate to methods, systems, articles of manufacture, and the like that can, among other possible advantages, provide automatic queries to update databases.

Users can create a design definition in a human friendly format that represents a new version of a runtime database artifact stored in a database. The definition can be used to compare runtime metadata of the runtime database artifact with design time metadata of a desired specification and to find the differences between the design time metadata and the runtime metadata. The differences between the design time metadata and the runtime metadata can be used to automatically generate the queries to update the database artifact. In the described implementations, an end user can create design definitions in a human friendly format and a computing system is assigned to generate complex queries for altering the database artifacts. The described mechanism that can be used for database upgrades can also be used for database downgrades as it is not tied to a file versioning system. The discussed solution can allow the user to specify how the new version of the database should look without having to specify detailed changes that should be applied. As an advantage of the proposed solution, the user does not need to have deep knowledge of database queries or the existing database schema in order to write the complex queries that are required to migrate a database artifact to a newer version.

Figure 1:
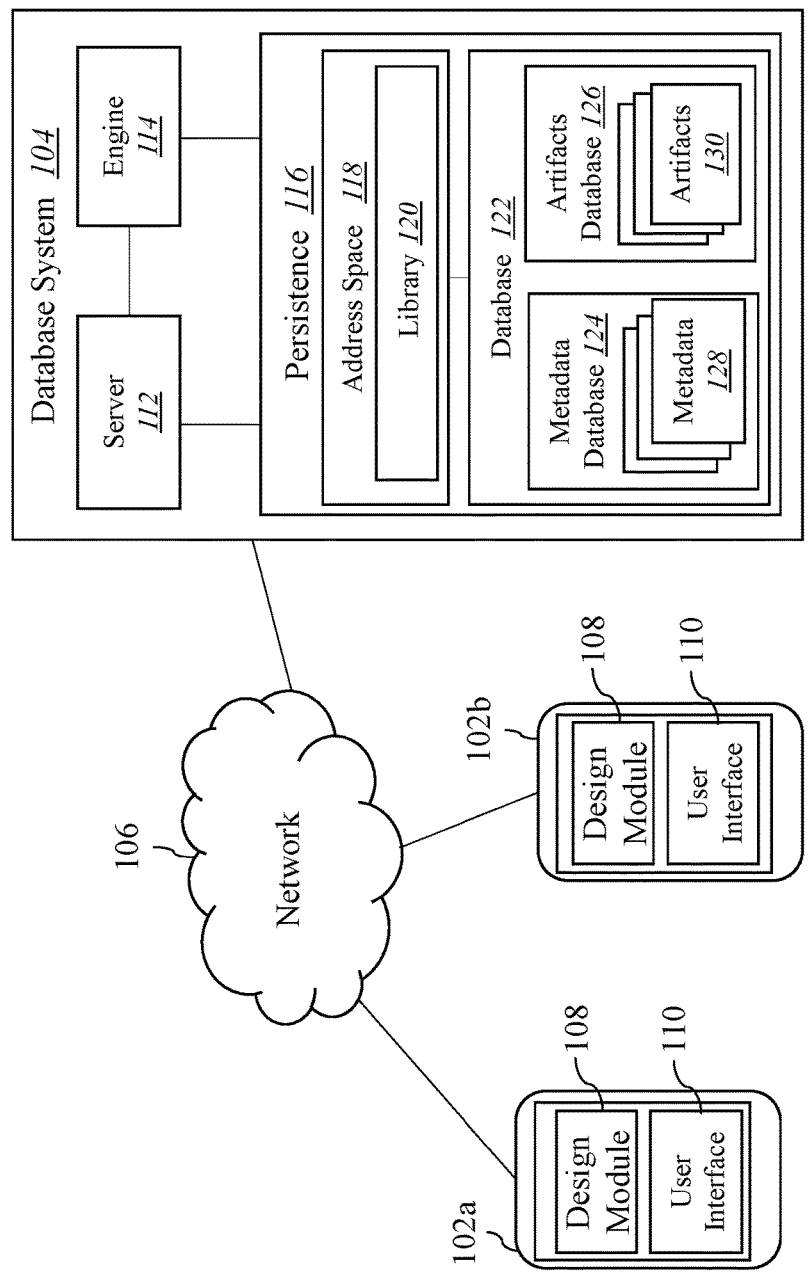
FIG. 1 depicts a diagram of an example system, in accordance with some example implementations.

FIG. 1 illustrates an example of a system 100 for automatically updating database artifacts, according to some implementations of the current subject matter. The system 100 can be configured to execute one or more processes for automatically updating database artifacts, such as example process 300 described with reference to FIG. 3. The system 100 can include one or more user devices 102a, 102b that can access a database system environment 104 via a network 106.

The user devices 102a, 102b can be configured to enable generating a user friendly entry that defines a new version of a runtime database artifact. The user devices 102a, 102b can be and/or include any type of processor and memory based device, such as, for example, cellular phones, smart phones, tablet computers, laptop computers, desktop computers, workstations, personal digital assistants (PDA), network appliances, cameras, enhanced general packet radio service (EGPRS) mobile phones, media players, navigation devices, email devices, game consoles, or an appropriate combination of any two or more of these devices or other data processing devices. In the depicted example, the user devices 102a, 102b include a design definition module 108 and a user interface 110. The design definition module 108 can be configured to enable creation of design time metadata from a design time definition for a database artifact stored in the database system 104. The user interface 110 can process the user input to generate a design time definition for a database artifact stored in the database system 104.

As shown in FIG. 1, the user devices 102a, 102b can be communicatively coupled with the database system 104 to transmit, over the network 106, the design time metadata for updating the database artifact stored in the database system 104. It should be appreciated that the network 106 can be any wired and/or wireless network including, for example, a public land mobile network (PLMN), a local area network (LAN), a wide area network (WAN), the Internet, a cellular network, a telephone network (e.g., PSTN) or an appropriate combination thereof connecting any number of communication devices, mobile computing devices, fixed computing devices, server systems, and/or the like.

The database system 104 can be configured to process the design time definition for the database artifact and execute a process that updates the respective database artifact 130. The database system 104 can be any type of database including, for example, an in-memory database, a relational database, a non-SQL (NoSQL) database, and/or the like. In some implementations, the database system 104 and/or any of its components can be incorporated and/or part of a container system that can be used in cloud implementations. As shown in FIG. 1, the database system 104 can include a server 112, an application function library engine 114, and a persistence module 116. The persistence module 116 can include an address space 118 and a database 122 including a metadata database 124 and an artifacts database 126.

The server 112 can be running instances of the corresponding executables (e.g., .exe files) included in a kernel of the database system 104. It should be appreciated that the kernel of the database system 104 can also include other executable (e.g., .exe files) required for running the database system 104. In some implementations, an executable can be a computer program that have already been compiled into machine language (e.g., binary code) and is therefore capable of being executed directly by a data processor. As shown in FIG. 1, the database system 104 can be a dedicated, single-container database system running a single instance of the server 112. However, where the database system 104 implements a multitenant database architecture (e.g., multitenant database containers (MDC)), each tenant of the database system 104 can be served by separate instances of the server 112.

With continued reference to FIG. 1, the server 112 can be associated with a particular address space 118 of the persistence module 116. As used herein, the address space 118 can refer to a range of memory addresses assigned to a computational entity such as, for example, the server 112. In some example implementations, the server 112 can be a database index server configured to process incoming database queries, for example, based on the differences between the design time metadata and the runtime metadata.

The database system 104 can be configured to process design time metadata included in database queries received from the user devices 102a, 102b, to retrieve runtime metadata 128 from the metadata database 124, to update database artifacts 130 stored within the artifacts database 126. Processing the database queries can require running one or more application functions from an application function library 120. For example, the user devices 102a, 102b can send, to the database system 104, a database query that requires performing an update of a database artifact 130 stored in the artifacts database 126 of the database 122. The address space 118 can include a metadata database 124 used by the engine 114 to retrieve corresponding runtime metadata 128 from the metadata database 124 to determine differences between the design time metadata and the runtime metadata to update the database artifact 130. In some implementations, the database artifact 130 can be automatically updated on demand, e.g., upon determination of differences between the design time metadata and the runtime metadata 128 to update the database artifact 130 stored in the artifacts database 126 of the database 122.

In some implementations, the metadata 128 can include a description of the database artifact 130 stored in the artifacts database 126, such as dimensions of the database artifact 130 and allocated size of data to be stored at each dimension of the database artifact 130. Loading the design time metadata into the address space 118 of the server 112 can register, as database procedures, the application functions included in the application function library 120 for updating the database artifact 130 (e.g., by modifying a dimension of the database artifact). For example, updating the database artifact 130 using an application function as a database procedure can add the application function as a database object to the library 120 (e.g., a database catalog) of the database system 104. It should be appreciated that the database catalog of the database system 104 can include definitions of a plurality of database objects including, for example, tables, views, indexes, users groups, procedures, and/or the like.

Once the design time metadata is loaded into the first address space 118 of the server 112, the application function library 120 can then be loaded on demand. For example, the database system 104 can load the application function library 120 in response to a database query that requires running one or more application functions from the application function library 120 to update the database artifact 130. Alternatively, or additionally, the application function library 120 can be loaded upon determination either by a primary and/or a secondary server that an executed function can require access to another application function in an application function library that have not been loaded into the container database system. The database system 104 can receive, from the user device 102a, 102b, a database query including a design time definition for a database artifact 130 stored in the artifact database 126. To process the database query, the server 112 can identify, based at least on the files/metadata library 120, the one or more application functions from the application function library 120 that is required to execute the database query and automatically executes the database query to update the artifact 130.

Figure 2:
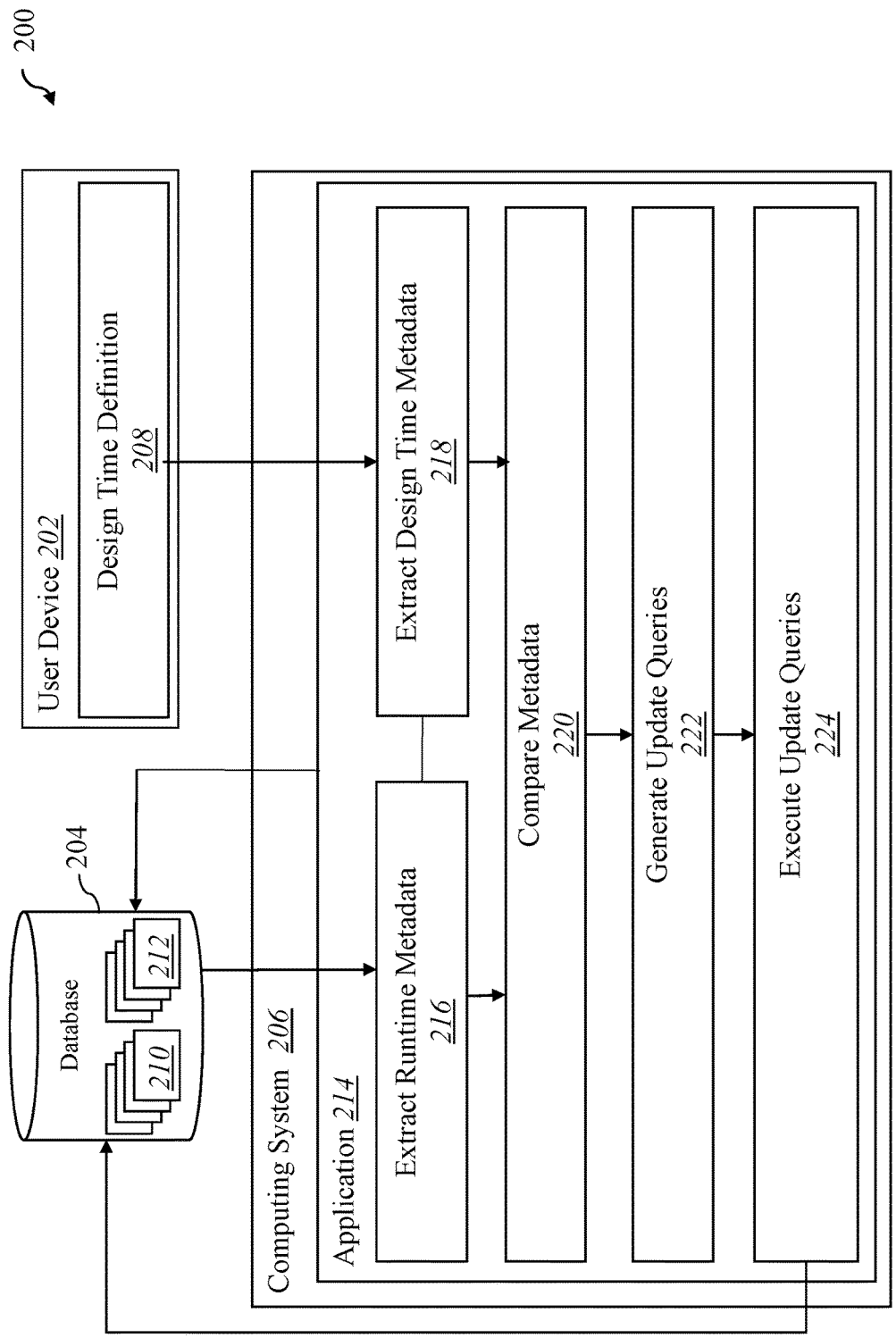
FIG. 2 depicts an example of a conceptual architecture, in accordance with some example implementations.

FIG. 2 illustrates an example of a conceptual architecture 200 for automatically updating database artifacts, according to some implementations of the current subject matter. The example conceptual architecture 200 can be configured to execute one or more processes for automatically updating database artifacts, such as example process 300 described with reference to FIG. 3. The example conceptual architecture 200 can include a user devices 202, a database 204, and a computing system 206.

The user device 202 can be configured to receive a user input including a design time definition 208 for a database artifact 210 stored in the database 204, such as user devices 102a, 102b described with reference to FIG. 1. The database 204 can be the database system 104, described with reference to FIG. 1. The database 204 can be a cloud database system environment, such as Analytics Cloud (SAC) Data Warehouse Cloud or High performance Analytic Appliance (HANA), as available from SAP AG, Walldorf, Germany although other types of databases can be used as well. In some implementations, the database 204 can include an on-premise database system (e.g., system databases, tenant databases, etc.), servers (e.g., name server(s), index server(s), script server(s), etc.).

The database 204 can be accessible (e.g., via queries, procedure calls, etc.) by the user devices 202 and the computing system 206. The database 204 can include a runtime database that holds the latest database artifacts 210 (application data) and stores the database artifacts 210 in a database specific structure in parallel with respective metadata 212. The computing system 206 can include an application 214 that uses the runtime database to provide definitions of the database artifacts 210 (tables, views, and other application data structures) that can be created on the database 204 as metadata 212.

For example an artifact 210 including a table named CUSTOMERS can be defined using the following definition of the artifact 210:

```
COLUMN TABLE "CUSTOMERS" (
  "CUSTOMER_ID"    INTEGER,
  "CUSTOMER_NAME"    VARCHAR(256),
  "CUSTOMER_ADDRESS" VARCHAR(512),
  PRIMARY KEY ("CUSTOMER_ID")
);
```

The application can process the design time definition of the database artifact 210, interpret it, and execute the appropriate queries in order to create the corresponding metadata 212 and the CUSTOMERS table, as a database artifact 210, on the database 204. The application 214 includes an extract runtime metadata function 216 that can use the internal structure of the database 204 to extract the corresponding metadata 212 of the database artifact 210. The metadata 212 describes the database's internal structures in a format that can be used for inspection of the structures of a respective of the database artifact 210 as described with reference to FIG. 3. An example of metadata 212 that can be extracted from the example database artifact 210 (CUSTOMERS table) as shown in Table 1.

TABLE 1

| Column Name | Type | Length | Primary Key |
|---|---|---|---|
| CUSTOMER_ID | INTEGER | — | YES |
| CUSTOMER_NAME | VARCHAR | 256 | NO |
| CUSTOMER_ADDRESS | VARCHAR | 512 | NO |

The design time definition 208 that is provided by the user device 202 contains the definition of a design time updated structure of a database artifact 210 to be stored by the database 204 after the database artifact 210 has been updated. Within the example context using the database artifact 210 (CUSTOMERS table) a new field can be added by the design time definition 208, to store the customer's postal code. The updated design time definition 208 can be modified as follows:

```
COLUMN TABLE "CUSTOMERS" (
  "CUSTOMER_ID"    INTEGER,
  "CUSTOMER_NAME"    VARCHAR(256),
  "CUSTOMER_ADDRESS" VARCHAR(512),
  "CUSTOMER_POST_CODE" VARCHAR(16),
  PRIMARY KEY ("CUSTOMER_ID")
);
```

The application 214 can include an extract design time metadata function 218 to extract the metadata 212 that describes the design time definition 208. Within the example context using the database artifact 210 (CUSTOMERS table), the extract design time metadata function 218 can extract metadata 212 from the updated design time definition 208 to generate a design time metadata as illustrated in Table 2.

TABLE 2

| Column Name | Type | Length | Primary Key |
|---|---|---|---|
| CUSTOMER_ID | INTEGER | — | YES |
| CUSTOMER_NAME | VARCHAR | 256 | NO |
| CUSTOMER_ADDRESS | VARCHAR | 512 | NO |
| CUSTOMER_POST_CODE | VARCHAR | 16 | NO |

The application 214 can include a compare metadata function 220 to compare the runtime and design metadata definitions and find the differences. The compare metadata function 220 can include two steps: to identify metadata differences and to produce remedial definitions. To identify metadata differences, the runtime and design metadata definitions are compared, and all differences are identified in a comparison result that can be formatted as a table. Within the produce remedial definitions step, the identified differences are analysed, and the corresponding remedial definitions are generated. The remedial definitions can include add, alter, drop, delete, and rename portions of the database artifact 210. Though this list is not exhaustive, and any action applicable to a database can be utilised by the framework. Within the example context using the database artifact 210 (CUSTOMERS table), the compare metadata function 220 can discovered that a new column was added, the result being illustrated by Table 3. In response to identifying that a new column was added, a definition is produced describing the difference and the corresponding remedial action including add column can be taken.

TABLE 3

| Column Name | Type | Length | Is Primary Key | Action |
|---|---|---|---|---|
| CUSTOMER_POST_CODE | VARCHAR | 16 | NO | ADD COLUMN |

The application 214 can include a generate update query function 222 to process the differences included in the comparison result, and generate structured language queries that can be used to update the database 204. Within the example context using the database artifact 210 (CUSTOMERS table), to add the new column to the CUSTOMERS table an alter table query needs to be generated as following:
  ALTER TABLE "CUSTOMERS" ADD "CUSTOMER_POST_CODE" VARCHAR(16);

The application 214 can include an execute update query function 224 to process the generated queries and execute the queries on the database 204 in order to update the database artifact 210 according to the structure defined in the design time definition 208. By way of a non-limiting example, a structured query language (SQL) can be used to execute the queries on the database 204. The query can include a particular identifier associated with the respective database artifact 210. The extracted design time metadata associated with the updated database artifact 210 can be stored in the database 204 for future processes associated with the database artifact 210. The update of the database artifact 210 and the metadata 212 into the database 204 can be executed during runtime (e.g., C++ runtime).

The application functions 216-224, used to update database artifacts, can include a dynamic link library (e.g., it can be a shared object in Linux). Alternatively, or in addition to, the application functions 216-224 can be included in a library as an add-on to the database 204 and thus, can require a separate additional installation. For example, a function library can be loaded during runtime (e.g., using C++) into a running executable (e.g., an index server and/or a script server). In some cases, the loading can be performed using a database lifecycle manager tool (e.g., HANA Database Lifecycle Manager, as available from SAP SE, Walldorf, Germany, while other types of databases can also be used). Using this tool, the application function library along with various control files and/or any other files can be copied into a plug-ins subdirectory of the system's run directory. Subsequent to the copying, the installation of the application function library can be triggered. In some implementations, an application function library for updating database artifacts can be installed at a server (e.g., an index server or a script server) that has its own container. From there, the application function library can be loaded into one or more running processes to allow for execution of application functions 216-224 to automatically update database artifacts 210 based on the differences between the design time metadata and the runtime metadata 212.

Figure 3:
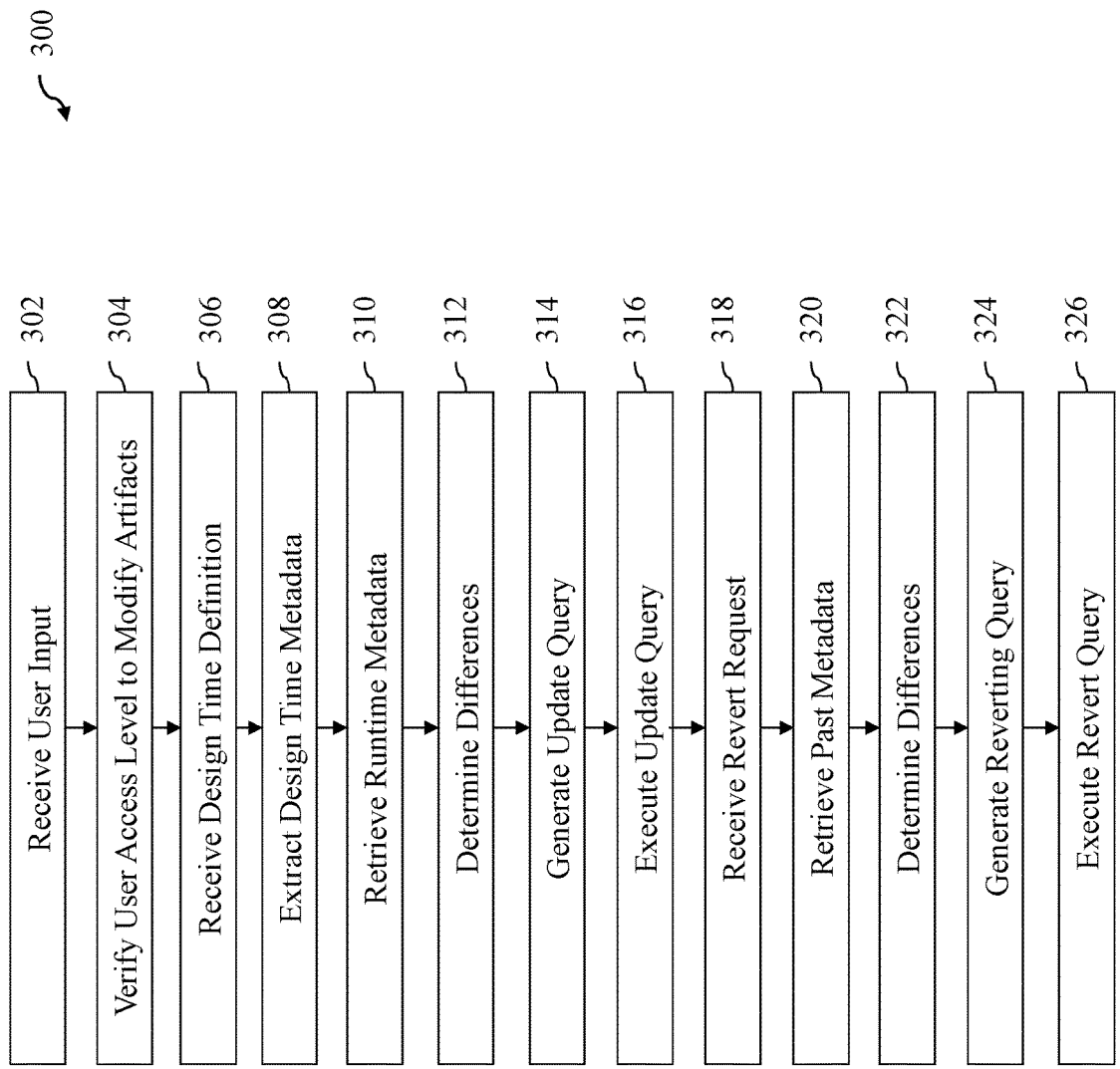
FIG. 3 depicts a flowchart illustrating an example process, in accordance with some example implementations.

FIG. 3 illustrates an example process 300 for automatically updating database artifacts, according to some implementations of the current subject matter. The process 300 can be executed by the system 100 shown in FIG. 1, using the conceptual architecture 200 shown in FIG. 2, the system 400 shown in FIG. 4 or any combination thereof.

At 302, a user input entered on a user device is received. The user input can include user credentials and an indication of an intent to update a database artifact stored in a database. The database artifact can include tables, views, application data, application data structures and other database data structures. The database artifact can include multiple features, such as dimensions, each dimension being configured to include data of a particular type, format, and size. The database artifact can be configured to include at least one modifiable portion (e.g., one or more dimensions of the database artifact can be extended or shrunk and/or data stored within a dimension can be updated to a new format, size and/or type).

At 304, the user credentials can be processed to verify a user access level to modify the database artifact, by determining whether the user is allowed to create, update or revert to a previous version of (the modifiable portion of) the database artifact stored in a database. For example, if the user credentials match credentials of a database administrator or the credentials of an entity identified as an author of the database artifact, the user can be provided access to modify the database artifact.

At 306, if the user is provided access to modify the database artifact, a design time definition for a database artifact stored in a database is received. The design time definition can include a request to modify a dimension of the database artifact (multidimensional object). The design time definition can describe how the new version of the database artifact should be structured and defined, excluding a description of the changes to be applied for updating the database artifact. For example, the design time definition can include an identifier of the database artifact, the updated number of dimensions and the data type, format and size corresponding to each dimension.

At 308, design time metadata can be extracted from the design time definition. The design time metadata can include a table defining a designed (desired) structure of the database artifact after the update. The table can include a number of dimensions (e.g., number of columns), dimension identifiers (column names), types of data to be allocated to each dimension (e.g., integer or variable character), data size (length) and a primary key of each dimension (e.g., binary values such as "yes" or "no").

At 310, runtime metadata corresponding to the database artifact is retrieved from the database. In some implementations, the runtime metadata corresponding to the database artifact is retrieved from the database using the database artifact identifier included in the user input (provided with the design time definition). The runtime metadata can include a table defining a current structure of the current database artifact. In some implementations, retrieving the runtime metadata from the database includes querying a storage location storing the database artifact, the storage location storing a plurality of metadata records corresponding to multiple structure states of the database artifact. The search can be performed using at least an identifier of the database artifact. For example, the metadata records can be searched using an identifier of the runtime metadata corresponding to a current structure state of the database artifact. In some implementations, the runtime metadata corresponding to the database artifact is retrieved from the database using the identifier of the runtime metadata corresponding to the current structure state of the database artifact.

At 312, differences between the design time metadata and the runtime metadata are determined. Determining the differences can include: identifying metadata differences, and producing remedial definitions. To identify metadata differences, the definitions of the runtime metadata and design time metadata are compared, and all differences are identified in a comparison result that can be formatted as a table. Generating remedial definitions can include an analysis of the identified differences and generating corresponding remedial definitions. The remedial definitions can include add, alter, drop, delete, resize, reformat, and rename portions (dimensions, such as columns) of the database artifact. For example, if the comparison of the metadata indicates that a new column is requested to be added, the determined differences include a definition of the new column with its data attributes describing the difference and the corresponding remedial action including column addition.

At 314, an update query is generated. The update query can be generated based on the differences between the design time metadata and the runtime metadata. In some implementations, the update query can be generated based on remedial definitions indicating the differences between the design time metadata and the runtime metadata. The update query can include an identifier of the database artifact and an operator defining how to update the database artifact to remedy the determined differences. The update query can be structured as an alter table.

At 316, the update query is executed to update the database artifact according to the design time definition. In some implementations, the update query can be executed, on the database, by a structured query language (SQL).

At 318, a reverting request is received. The reverting request can include an identifier of the database artifact and a request to revert the database artifact to an older version with a past structure state that can be identified based on a version identifier (e.g., identifier of the time when the database artifact was updated). In some implementations, the reverting request can describe the past structure state of the database artifact corresponding to the old version of the database artifact, excluding a description of the changes to be applied for updating the database artifact.

At 320, past metadata can be extracted from the design time definition or from the database by using the version identifier. The past metadata can include a table defining a past (currently desired) structure of the database artifact.

At 322, differences between the past metadata and the runtime metadata are determined. Determining the differences can include: identifying metadata differences, and producing remedial definitions. To identify metadata differences, the definitions of the runtime metadata and past metadata are compared, and all differences are identified in a comparison result that can be formatted as a table. Generating remedial definitions can include an analysis of the identified differences and generating corresponding remedial definitions. The remedial definitions can include add, alter, drop, delete, resize, reformat, and rename portions (dimensions, such as columns) of the database artifact. For example, if the comparison of the metadata indicates that a new column is requested to be added, the determined differences include a definition of the new column with its data attributes describing the difference and the corresponding remedial action including column addition.

At 324, a reverting query is generated. The reverting query can be generated based on the differences between the past metadata and the runtime metadata. In some implementations, the reverting query can be generated based on remedial definitions indicating the differences between the past metadata and the runtime metadata. The reverting query can include an identifier of the database artifact and an operator defining how to update the database artifact to remedy the the determined differences. The reverting query can be structured as an alter table.

At 326, the reverting query is executed to update the database artifact according to the design time definition. In some implementations, the reverting query can be executed, on the database, by the structured query language (SQL).

The example process 300 includes operations that enable a computing system to process simplistic user entries to generate complex queries for altering the database artifacts. The example process 300 can be used for database upgrades can also be used for database downgrades as it is not tied to a file versioning system.

Figure 4:
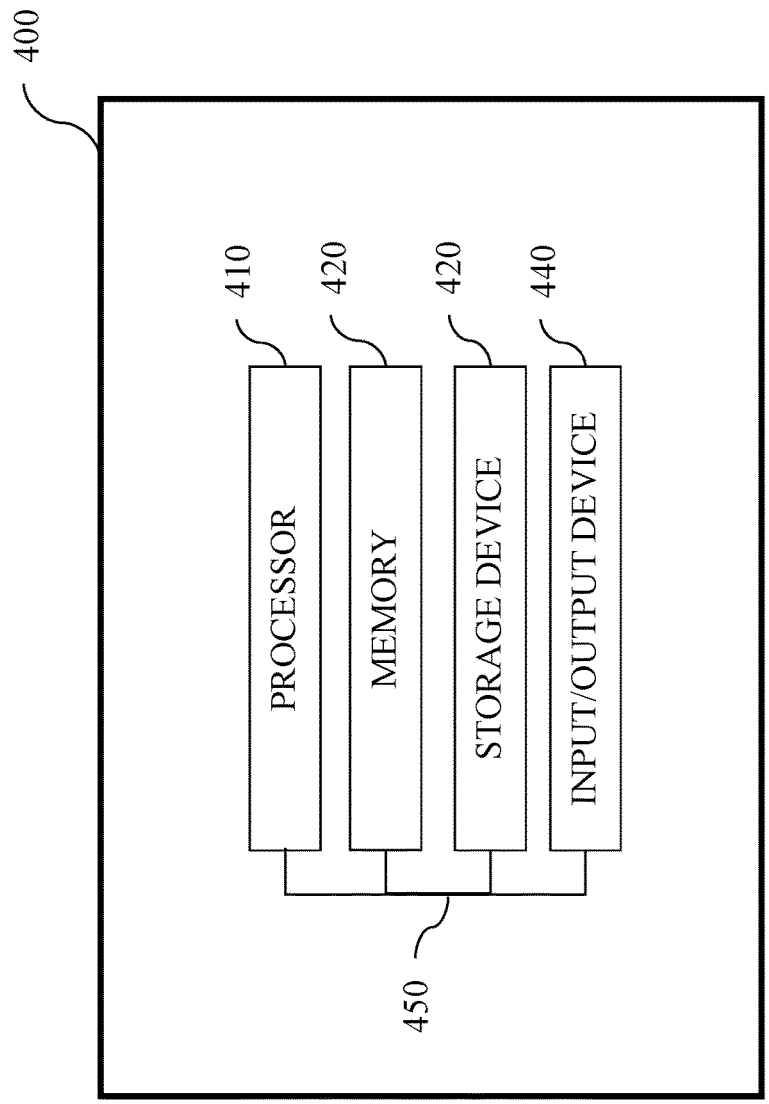
FIG. 4 depicts a block diagram illustrating a computing system, in accordance with some example implementations.

In some implementations, the current subject matter can be configured to be implemented in a system 400, as shown in FIG. 4. The system 400 can include a processor 410, a memory 420, a storage device 430, and an input/output device 440. Each of the components 410, 420, 430 and 440 can be interconnected using a system bus 450. The processor 410 can be configured to process instructions for execution within the system 400. In some implementations, the processor 410 can be a single-threaded processor. In alternate implementations, the processor 410 can be a multi-threaded processor. The processor 410 can be further configured to process instructions stored in the memory 420 or on the storage device 430, including receiving or sending information through the input/output device 440. The memory 420 can store information within the system 400. In some implementations, the memory 420 can be a computer-readable medium. In alternate implementations, the memory 420 can be a volatile memory unit. In yet some implementations, the memory 420 can be a non-volatile memory unit. The storage device 430 can be capable of providing mass storage for the system 400. In some implementations, the storage device 430 can be a computer-readable medium. In alternate implementations, the storage device 430 can be a floppy disk device, a hard disk device, an optical disk device, a tape device, non-volatile solid state memory, or any other type of storage device. The input/output device 440 can be configured to provide input/output operations for the system 400. In some implementations, the input/output device 440 can include a keyboard and/or pointing device. In alternate implementations, the input/output device 440 can include a display unit for displaying graphical user interfaces.

In some implementations, one or more application function libraries in the plurality of application function libraries can be stored in the one or more tables as binary large objects. Further, a structured query language can be used to query the storage location storing the application function library.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more user device computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include user devices and servers. A user device and server are generally, but not exclusively, remote from each other and typically interact through a communication network. The relationship of user device and server arises by virtue of computer programs running on the respective computers and having a user device-server relationship to each other.

Further non-limiting aspects or implementations are set forth in the following numbered examples:

Example 1: A computer-implemented method comprising: receiving, by one or more processors, a design time definition for a database artifact stored in a database; extracting, by the one or more processors, design time metadata from the design time definition; retrieving, by the one or more processors, runtime metadata from the database, the runtime metadata corresponding to the database artifact; determining, by the one or more processors, differences between the design time metadata and the runtime metadata; generating, by the one or more processors, an update query based on the differences between the design time metadata and the runtime metadata; and executing, by the one or more processors, the update query to update the database artifact.

Example 2: The computer-implemented method of example 1, wherein the database artifact comprises a multidimensional object.

Example 3: The computer-implemented method of example 1 or 2, wherein the design time definition comprises a request to modify a dimension of the multidimensional object.

Example 4: The computer-implemented method of any one of examples 1 to 3, further comprising: generating, by the one or more processors, remedial definitions based on the differences between the design time metadata and the runtime metadata; and generating, by the one or more processors, the update query using the remedial definitions indicating the differences between the design time metadata and the runtime metadata.

Example 5: The computer-implemented method of any one of examples 1 to 4, wherein retrieving, by the one or more processors, the runtime metadata from the database comprises: querying, by the one or more processors, a storage location storing the database artifact, the storage location storing a plurality of metadata records corresponding to a plurality of states of the database artifact; searching, by the one or more processors, using at least an identifier of the database artifact, the plurality of metadata records to search an identifier of the runtime metadata corresponding to a current state of the database artifact; and retrieving, by the one or more processors, based on the identifier, the runtime metadata corresponding to the current state of the database artifact.

Example 6: The computer-implemented method of any one of examples 1 to 5, further comprising: receiving, by the one or more processors, a query to revert the database artifact to a past structure; and searching, by the one or more processors, using at least the identifier of the database artifact, the plurality of metadata records to search a past metadata corresponding to the past structure of the database artifact; generating, by the one or more processors, a reverting query based on the differences between the past metadata and the runtime metadata; and executing, by the one or more processors, the revert query to update the database artifact.

Example 7: The computer-implemented method of any one of examples 1 to 6, further comprising: determining, by the one or more processors, an access level to update the database artifact; and selectively executing, by the one or more processors, the update query to update the database artifact according to the access level.

Example 8: A system comprising: at least one programmable processor; and a non-transitory machine-readable medium storing instructions that, when executed by the at least one programmable processor, cause the at least one programmable processor to perform operations comprising: receiving a design time definition for a database artifact stored in a database; extracting design time metadata from the design time definition; retrieving runtime metadata from the database, the runtime metadata corresponding to the database artifact; determining differences between the design time metadata and the runtime metadata; generating an update query based on the differences between the design time metadata and the runtime metadata; and executing the update query to update the database artifact.

Example 9: The system of example 8, wherein the database artifact comprises a multidimensional object.

Example 10: The system of example 8 or 9, wherein the design time definition comprises a request to modify a dimension of the multidimensional object.

Example 11: The system of any one of examples 8 to 10, wherein the operations further comprise: generating remedial definitions based on the differences between the design time metadata and the runtime metadata; and generating the update query using the remedial definitions indicating the differences between the design time metadata and the runtime metadata.

Example 12: The system of any one of examples 8 to 11, wherein retrieving the runtime metadata from the database comprises: querying a storage location storing the database artifact, the storage location storing a plurality of metadata records corresponding to a plurality of states of the database artifact; searching using at least an identifier of the database artifact, the plurality of metadata records to search an identifier of the runtime metadata corresponding to a current state of the database artifact; and retrieving based on the identifier, the runtime metadata corresponding to the current state of the database artifact.

Example 13: The system of any one of examples 8 to 12, wherein the operations further comprise: receiving a query to revert the database artifact to a past structure; and searching using at least the identifier of the database artifact, the plurality of metadata records to search a past metadata corresponding to the past structure of the database artifact; generating a reverting query based on the differences between the past metadata and the runtime metadata; and executing the revert query to update the database artifact.

Example 14: The system of any one of examples 8 to 13, wherein the operations further comprise: determining an access level to update the database artifact; and selectively executing the update query to update the database artifact according to the access level.

Example 15: A non-transitory computer readable medium storing instructions, which when executed by at least one data processor, result in operations comprising: receiving a design time definition for a database artifact stored in a database; extracting design time metadata from the design time definition; retrieving runtime metadata from the database, the runtime metadata corresponding to the database artifact; determining differences between the design time metadata and the runtime metadata; generating an update query based on the differences between the design time metadata and the runtime metadata; and executing the update query to update the database artifact.

Example 16: The non-transitory computer readable medium of example 15, wherein the database artifact comprises a multidimensional object.

Example 17: The non-transitory computer readable medium of example 15 or 16, wherein the design time definition comprises a request to modify a dimension of the multidimensional object.

Example 18: The non-transitory computer readable medium of any one of examples 15 to 17, wherein the operations further comprise: generating remedial definitions based on the differences between the design time metadata and the runtime metadata; and generating the update query using the remedial definitions indicating the differences between the design time metadata and the runtime metadata.

Example 19: The non-transitory computer readable medium of any one of examples 15 to 18, wherein retrieving the runtime metadata from the database comprises: querying a storage location storing the database artifact, the storage location storing a plurality of metadata records corresponding to a plurality of states of the database artifact; searching using at least an identifier of the database artifact, the plurality of metadata records to search an identifier of the runtime metadata corresponding to a current state of the database artifact; and retrieving based on the identifier, the runtime metadata corresponding to the current state of the database artifact.

Example 20: The non-transitory computer readable medium of any one of examples 15 to 19, further comprising: receiving a query to revert the database artifact to a past structure; and searching using at least the identifier of the database artifact, the plurality of metadata records to search a past metadata corresponding to the past structure of the database artifact; generating a reverting query based on the differences between the past metadata and the runtime metadata; and executing the revert query to update the database artifact.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method comprising:
    receiving, by one or more processors, a design time definition for a database artifact stored in a database;
    extracting, by the one or more processors, design time metadata from the design time definition;
    retrieving, by the one or more processors, runtime metadata from the database, the runtime metadata corresponding to the database artifact;
    comparing, by the one or more processors, the design time metadata and the runtime metadata;
    determining, by the one or more processors, differences between the design time metadata and the runtime metadata based on a comparison result;

generating, by the one or more processors, an update query based on the differences between the design time metadata and the runtime metadata; and executing, by the one or more processors, the update query to update the database artifact according to the design time definition.

2. The computer-implemented method of claim 1, wherein the database artifact comprises a multidimensional object.

3. The computer-implemented method of claim 2, wherein the design time definition comprises a request to modify a dimension of the multidimensional object.

4. The computer-implemented method of claim 1, further comprising:
generating, by the one or more processors, remedial definitions based on an analysis of the differences between the design time metadata and the runtime metadata; and
generating, by the one or more processors, the update query using the remedial definitions indicating the differences between the design time metadata and the runtime metadata, wherein the update query includes an identifier of the database artifact and an operator defining how to update the database artifact to remedy the differences between the design time metadata and the runtime metadata.

5. The computer-implemented method of claim 1, wherein retrieving, by the one or more processors, the runtime metadata from the database comprises:
querying, by the one or more processors, a storage location storing the database artifact, the storage location storing a plurality of metadata records corresponding to a plurality of states of the database artifact;
searching, by the one or more processors, using at least an identifier of the database artifact, the plurality of metadata records to search an identifier of the runtime metadata corresponding to a current state of the database artifact; and
retrieving, by the one or more processors, based on the identifier, the runtime metadata corresponding to the current state of the database artifact.

6. The computer-implemented method of claim 5, further comprising:
receiving, by the one or more processors, a query to revert the database artifact to a past structure; and
searching, by the one or more processors, using at least the identifier of the database artifact, the plurality of metadata records to search a past metadata corresponding to the past structure of the database artifact;
generating, by the one or more processors, a reverting query based on the differences between the past metadata and the runtime metadata; and
executing, by the one or more processors, the revert query to update the database artifact.

7. The computer-implemented method of claim 5, further comprising:
determining, by the one or more processors, an access level to update the database artifact; and
selectively executing, by the one or more processors, the update query to update the database artifact according to the access level.

8. A system comprising:
at least one programmable processor; and
a non-transitory machine-readable medium storing instructions that, when executed by the at least one programmable processor, cause the at least one programmable processor to perform operations comprising:
receiving a design time definition for a database artifact stored in a database;
extracting design time metadata from the design time definition;
retrieving runtime metadata from the database, the runtime metadata corresponding to the database artifact;
comparing the design time metadata and the runtime metadata;
determining differences between the design time metadata and the runtime metadata based on a comparison result;
generating an update query based on the differences between the design time metadata and the runtime metadata; and
executing the update query to update the database artifact according to the design time definition.

9. The system of claim 8, wherein the database artifact comprises a multidimensional object.

10. The system of claim 9, wherein the design time definition comprises a request to modify a dimension of the multidimensional object.

11. The system of claim 8, wherein the operations further comprise:
generating remedial definitions based on an analysis of the differences between the design time metadata and the runtime metadata; and
generating the update query using the remedial definitions indicating the differences between the design time metadata and the runtime metadata, wherein the update query includes an identifier of the database artifact and an operator defining how to update the database artifact to remedy the differences between the design time metadata and the runtime metadata.

12. The system of claim 8, wherein retrieving the runtime metadata from the database comprises:
querying a storage location storing the database artifact, the storage location storing a plurality of metadata records corresponding to a plurality of states of the database artifact;
searching using at least an identifier of the database artifact, the plurality of metadata records to search an identifier of the runtime metadata corresponding to a current state of the database artifact; and
retrieving based on the identifier, the runtime metadata corresponding to the current state of the database artifact.

13. The system of claim 12, wherein the operations further comprise:
receiving a query to revert the database artifact to a past structure; and
searching using at least the identifier of the database artifact, the plurality of metadata records to search a past metadata corresponding to the past structure of the database artifact;
generating a reverting query based on the differences between the past metadata and the runtime metadata; and
executing the revert query to update the database artifact.

14. The system of claim 12, wherein the operations further comprise:
determining an access level to update the database artifact; and selectively executing the update query to update the database artifact according to the access level.

15. A non-transitory computer readable medium storing instructions, which when executed by at least one data processor, result in operations comprising:
   receiving a design time definition for a database artifact stored in a database;
   extracting design time metadata from the design time definition;
   retrieving runtime metadata from the database, the runtime metadata corresponding to the database artifact;
   comparing the design time metadata and the runtime metadata;
   determining differences between the design time metadata and the runtime metadata based on a comparison result;
   generating an update query based on the differences between the design time metadata and the runtime metadata; and
   executing the update query to update the database artifact according to the design time definition.

16. The non-transitory computer readable medium of claim 15, wherein the database artifact comprises a multidimensional object.

17. The non-transitory computer readable medium of claim 16, wherein the design time definition comprises a request to modify a dimension of the multidimensional object.

18. The non-transitory computer readable medium of claim 15, wherein the operations further comprise:
   generating remedial definitions based on an analysis of the differences between the design time metadata and the runtime metadata; and
   generating the update query using the remedial definitions indicating the differences between the design time metadata and the runtime metadata, wherein the update query includes an identifier of the database artifact and an operator defining how to update the database artifact to remedy the differences between the design time metadata and the runtime metadata.

19. The non-transitory computer readable medium of claim 15, wherein retrieving the runtime metadata from the database comprises:
   querying a storage location storing the database artifact, the storage location storing a plurality of metadata records corresponding to a plurality of states of the database artifact;
   searching using at least an identifier of the database artifact, the plurality of metadata records to search an identifier of the runtime metadata corresponding to a current state of the database artifact; and
   retrieving based on the identifier, the runtime metadata corresponding to the current state of the database artifact.

20. The non-transitory computer readable medium of claim 19, further comprising:
   receiving a query to revert the database artifact to a past structure; and
   searching using at least the identifier of the database artifact, the plurality of metadata records to search a past metadata corresponding to the past structure of the database artifact;
   generating a reverting query based on the differences between the past metadata and the runtime metadata; and
   executing the revert query to update the database artifact.

* * * * *